United States Patent
Durfee

(10) Patent No.: US 9,687,915 B2
(45) Date of Patent: Jun. 27, 2017

(54) STEP DRILL

(71) Applicant: Irwin Industrial Tool Company, Huntersville, NC (US)

(72) Inventor: LaVerne R. Durfee, Harmony, NC (US)

(73) Assignee: IRWIN INDUSTRIAL TOOL COMPANY, Huntersville, NC (US)

( * ) Notice: Subject to any disclaimer, the term of this patent is extended or adjusted under 35 U.S.C. 154(b) by 284 days.

(21) Appl. No.: 14/299,163

(22) Filed: Jun. 9, 2014

(65) Prior Publication Data

US 2014/0369776 A1 Dec. 18, 2014

Related U.S. Application Data

(60) Provisional application No. 61/835,068, filed on Jun. 14, 2013.

(51) Int. Cl.
*B23B 51/00* (2006.01)

(52) U.S. Cl.
CPC ...... *B23B 51/009* (2013.01); *B23B 2251/282* (2013.01); *B23B 2251/70* (2013.01); *Y10T 408/906* (2015.01)

(58) Field of Classification Search
CPC ............ B23B 51/009; B23B 2251/282; B23B 2251/70; B23B 2251/40; B23B 2251/52
See application file for complete search history.

(56) References Cited

U.S. PATENT DOCUMENTS

| | | | | |
|---|---|---|---|---|
| 2,334,089 A * | 11/1943 | Hallden | .................. | B23B 51/02 408/211 |
| 2,897,696 A * | 8/1959 | Tisserant | .............. | B23B 51/009 408/225 |
| 3,758,222 A * | 9/1973 | Oakes | .................. | B23B 51/009 408/224 |
| 5,282,705 A * | 2/1994 | Shiga | ...................... | B23B 51/00 408/211 |
| 6,890,133 B2 | 5/2005 | Singh et al. | | |
| 8,070,397 B2 | 12/2011 | Durfee | | |
| 8,070,398 B2 | 12/2011 | Durfee | | |
| 8,764,355 B2 | 7/2014 | Durfee | | |
| 2012/0195704 A1* | 8/2012 | White | ................. | B23B 51/0081 408/224 |

FOREIGN PATENT DOCUMENTS

DE 202011106232 U1 * 11/2011 ............. B23B 1/009

OTHER PUBLICATIONS

English translation of DE 202011106232 U1, Nov. 2011.*

* cited by examiner

*Primary Examiner* — Sunil K Singh
*Assistant Examiner* — Alan Snyder
(74) *Attorney, Agent, or Firm* — Eversheds Sutherland (US) LLP

(57) ABSTRACT

A step drill bit has a cutting head defining a longitudinal axis and having a plurality of steps having different effective diameters. First and second cutting edges are formed in the cutting head. The first cutting edge and the second cutting edge are arranged such that the bit is asymmetric in a plane perpendicular to the longitudinal axis relative to a plane containing the longitudinal axis. A rubbing surface is formed on each step where the rubbing surface extends to approximately the effective diameter of that step such that the first cutting edge, second cutting edge and the rubbing surface forms three points of contact with the side wall of the hole being cut.

18 Claims, 3 Drawing Sheets

STEP DRILL

This application claims benefit of priority under 35 U.S.C. §119(e) to the filing date of U.S. Provisional Application No. 61/835,068 as filed on Jun. 14, 2013, which is incorporated herein by reference in its entirety.

BACKGROUND

The invention relates generally to drill bits and more particularly to step drill bits. A step drill bit typically comprises a series of graduated steps that permit the drilling of multiple different sized holes without changing the bit. Step drill bits are designed for use with power drills and may be used on all materials but are typically designed for use with metal.

SUMMARY

In some embodiments a step drill bit comprises a cutting head defining a longitudinal axis and having a plurality of steps having different effective diameters. First and second cutting edges are formed in the cutting head. The first cutting edge and the second cutting edge are arranged such that the bit is asymmetric in a plane perpendicular to the longitudinal axis relative to a plane containing the longitudinal axis.

A first flute and a second flute may divide the cutting head into a first land and a second land. The first land and the first flute may create the first cutting edge and the second land and the second flute may create the second cutting edge. The first cutting edge and the second cutting edge may be disposed at a center angle relative to one another of less than 180 degrees. The first cutting edge may be disposed at a center angle of between approximately 130 and 150 degrees relative to the second cutting edge. The first cutting edge may be disposed at a center angle of approximately 140 degrees relative to the second cutting edge. The first land may extend for a greater center angle than the second land. The plurality of steps may be configured to create three points of contact between each of the plurality of steps and a side wall of a hole being cut. The first cutting edge, the second cutting edge and a rubbing surface formed on each of the plurality of steps may extend to approximately the effective diameter. The first cutting edge, the second cutting edge and a rubbing surface formed on each of the plurality of steps may extend to approximately the effective diameter and the rubbing surface may comprise a negative relief formed on each of the plurality of steps. The rubbing surface may be formed on a trailing edge of each of the plurality of steps. The plurality of steps may comprise a positive radial relief extending from the first cutting edge and the second cutting edge a first arc length and each of the plurality of steps may be formed with an axial relief extending from the cutting edges a second arc length where the first arc length and the second arc length are different. The first arc length may be less than the second arc length. At least one of the first arc length and the second arc length may be different on at least two of the plurality of steps.

In some embodiments a step drill bit comprises a cutting head defining a longitudinal axis and having a plurality of steps having different effective diameters. Each step comprises a first step cutting edge and a second step cutting edge. A rubbing surface is formed on each step where the rubbing surface extends to approximately the effective diameter of that step.

The first cutting edge may be disposed at a center angle of between approximately 130 and 150 degrees relative to the second cutting edge. The rubbing surface may be formed by a negative relief on each step. The cutting head may comprise two flutes that define a first land and a second land, where the first land may be larger than the second land, and the rubbing surface may be on the first land. The rubbing surface may be located at a trailing end of the first land. Each of the plurality of steps may comprise a positive radial relief extending from the first step cutting edge and the second step cutting edge a first center angle and each of the plurality of steps may be formed with an axial relief extending from the first step cutting edge and the second step cutting edge a second center angle where the first center angle and the second center angle may be different.

DETAILED DESCRIPTION OF EMBODIMENTS OF THE INVENTION

Figure 1:
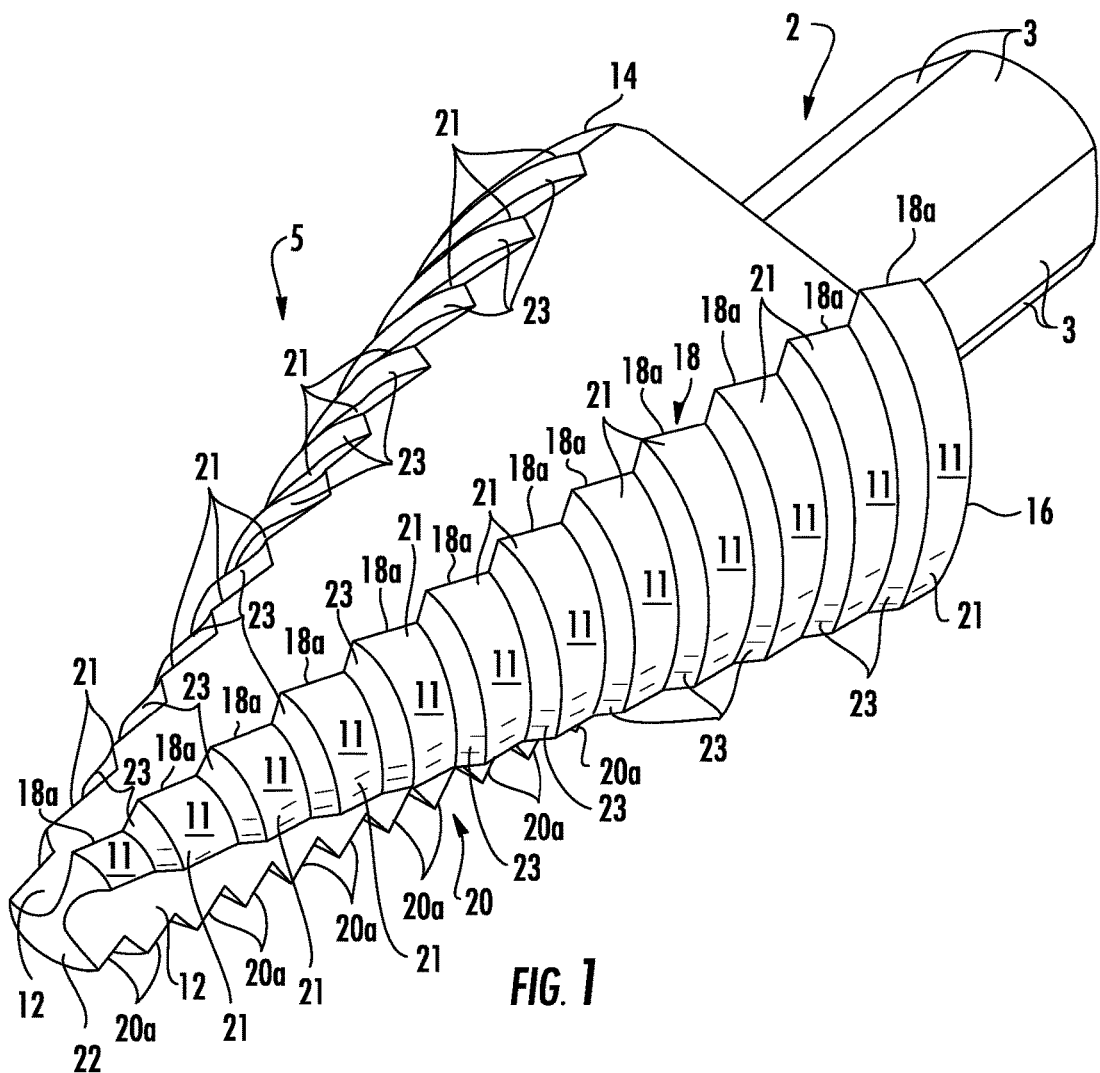
FIG. 1 is a perspective view of an embodiment of the step drill bit of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

A step drill bit is provided that comprises a plurality of variable diameter steps that mat typically be used to drill holes through relatively thin-walled materials such as, for example, metal; however, the step drill bit may be used to drill holes in other materials. The step drill bit as described herein is able to drill a plurality of different diameter holes. Typically, each step has a diameter where the step is dimensioned to cut a hole of a predetermined diameter in a relatively thin walled member. The steps are configured such that the steps increase in diameter from the leading end of the bit toward the trailing end of the bit.

Referring to FIGS. 1-4, in one embodiment the bit includes a shaft or shank 2 that is configured to be connected to the chuck of a rotary tool such as a power drill or the like. The shaft or shank 2 may comprise a plurality of flat faces 3 that may be received in the chuck of a rotary tool. In some embodiments the chuck of the rotary tool includes movable jaws that engage the flat faces 3 of the shank 2 such that the bit rotates with the chuck upon actuation of the rotary tool.

In some embodiments, the shank 2 may comprise a quick connect coupler such as a transverse groove or detents that receive a mating tang on the quick connect coupler of the rotary tool. Other connectors may be provided for connecting the bit to a rotary tool.

The shaft or shank 2 is connected to a cutting portion or head 5 comprising the step drill configuration. In some embodiments, the shank 2 and cutting portion 5 may be formed as one-piece and out of the same material. In other embodiments, the shank 2 and cutting portion 5, or portions of the cutting portion 5 such as the cutting edges and/or cutting tip, may be formed of separate elements, and may be made of different materials connected together to form the bit. The materials may be selected to have different properties where, for example, the cutting portion 5, or portions of the cutting portion 5 such as the cutting edges and/or cutting tip, may be formed of a harder material than the remainder of the bit. The different portions of the bit may be secured together to make a bit where the different portions of the bit are integrally connected together such as by using welding, brazing or the like to permanently secure the components together. In other embodiments, different portions of the bit (such as a cutting edge) may be removably secured such that the different portions of the bit may be disconnected from one another and removed and replaced during normal use of the bit.

Figures 2, 3:
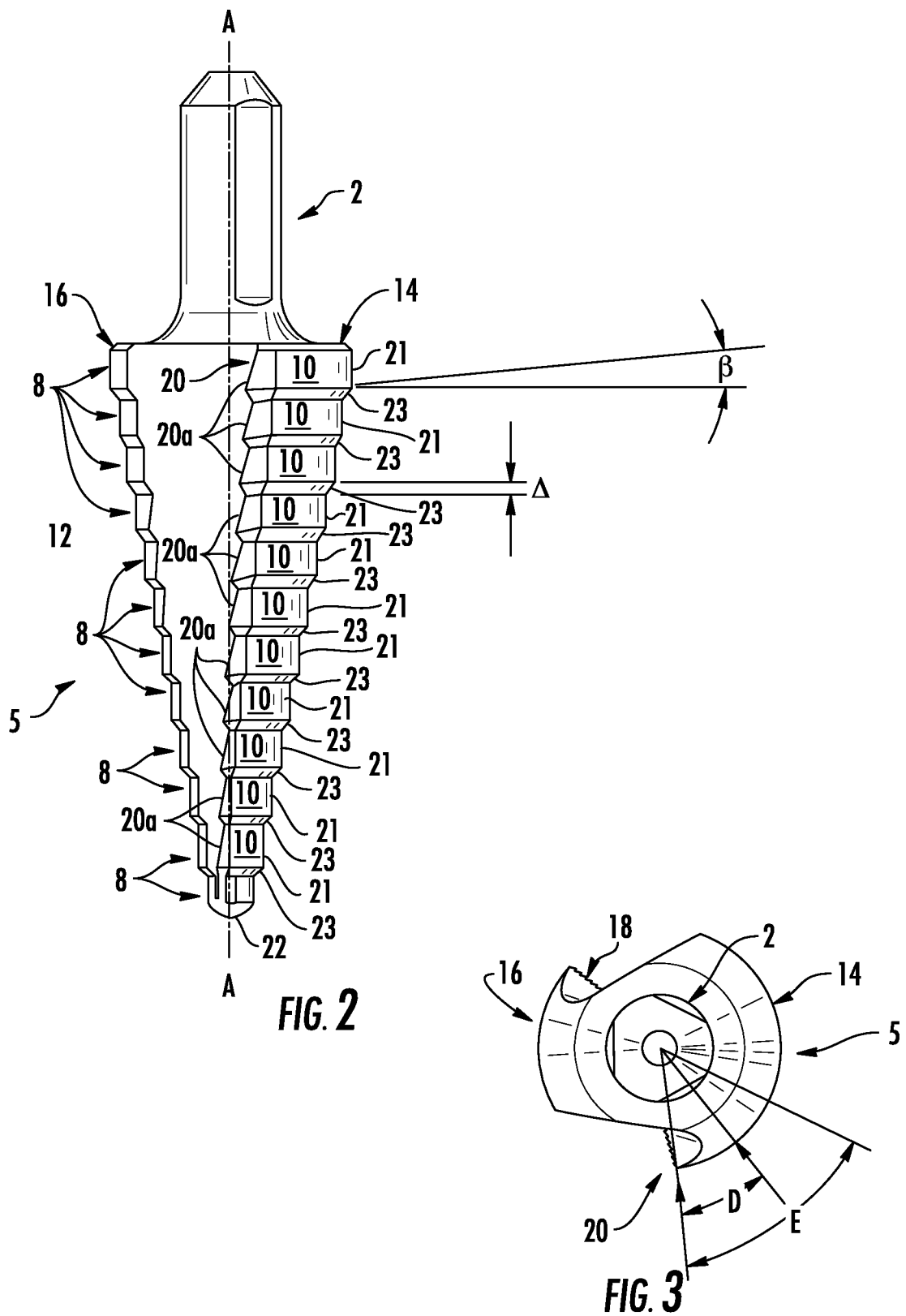
FIG. 2 is a plan view of an embodiment of the step drill bit of the invention.
FIG. 3 is an end view of a first end of an embodiment of the step drill bit.

In the illustrated embodiment, the cutting portion 5 is formed with twelve steps although a greater or fewer number of steps may be used. The cutting portion 5 may be formed with two flutes 12 that extend generally along the longitudinal axis A-A of the bit. The longitudinal axis A-A of the bit is the axis of rotation of the bit during use as shown in FIG. 2. The flutes 12 divide the cutting portion 5 into a first land 14 and a second land 16. The steps 8 are defined by the step sections 10 and 11 on lands 14 and 16, respectively, such that one step 8 is formed by the step section 10 on land 14 and the coextensive step section 11 on land 16. The lands 14, 16 and the two flutes 12 create two cutting edges 18 and 20 that define the cutting edges of each of the steps 8. Cutting edge 18 comprises a step cutting edge 18a formed on each of the step sections 11 of land 16 and cutting edge 20 comprises a step cutting edge 20a formed on each of the step sections 10 of land 14 where the step cutting edges 18a, 20a cooperate to cut a hole of the effective diameter. Thus, each step 8 cuts a hole of a particular effective diameter where the step is defined by a step section 10 and step cutting edge 20a on land 14 and a step section 11 and step cutting edge 18a on land 16.

As used herein the term "effective diameter" means that the step cutting edges 18a, 20a of each of the steps 8 cut a hole of a predetermined effective diameter. The effective diameters differ between the steps 8. The effective diameter of each step 8 is defined by the distance between the cutting edges 18a and 20a for that step (i.e. the diameter of the bit at that step) and defines the size of the hole drilled by that step. The step sections 10 and 11 are arranged such that the smallest effective diameter step is disposed at or near the distal end or point 22 of the head 5 and the largest effective diameter step is disposed near the shank 2 where the effective diameters of the steps 8 progressively increase from the distal end 22 toward the shank 2. In some embodiments the end of the bit 22 may be provided with a point such that the bit is self-starting and in other embodiments the point may be eliminated such that a pilot hole is drilled by another bit prior to using the step drill bit. One step drill bit may be used to cut a plurality of different sized holes in a thin walled material where each step section cuts a hole of a predetermined diameter. The bit may cut through the material where, as each step cuts through the material, a progressively larger hole is cut.

As used herein the terms "leading" and "trailing" refer to the relative orientation of the components during operation of the drill bit. Thus, a leading edge is an edge that is toward the front of the rotating bit and a trailing edge is an edge toward the rear of the rotating bit. Typically, a leading edge forms a cutting edge such that the leading edge has a sharp cutting geometry for cutting the material being drilled. Likewise, a leading step is a step toward the distal end 22 of the drill bit and a trailing step is a step toward the shank 2 of the bit.

Each step 8 comprises two step sections 10 and 11, one on each of lands 14 and 16, defining step cutting edges 20a and 18a where the two step sections 10, 11 and two cutting edges 18a, 20a of each step 8 cooperate to cut a single hole of a predetermined diameter. Each land 14, 16 comprises a leading or cutting edge 18, 20, respectively, that defines the step cutting edges 18a, 20a formed between the flutes 12 and the outer peripheral surfaces 21 of the step sections 10, 11. A transition surface 23 is formed between the peripheral surfaces 21 of each step section 10 and 11 to provide a transition between the different diameter steps where the transition surface 23 is typically formed at an included angle with a plane through longitudinal axis A-A of less than 90 degrees to make the transition between steps during drilling relatively smooth.

Figure 4:
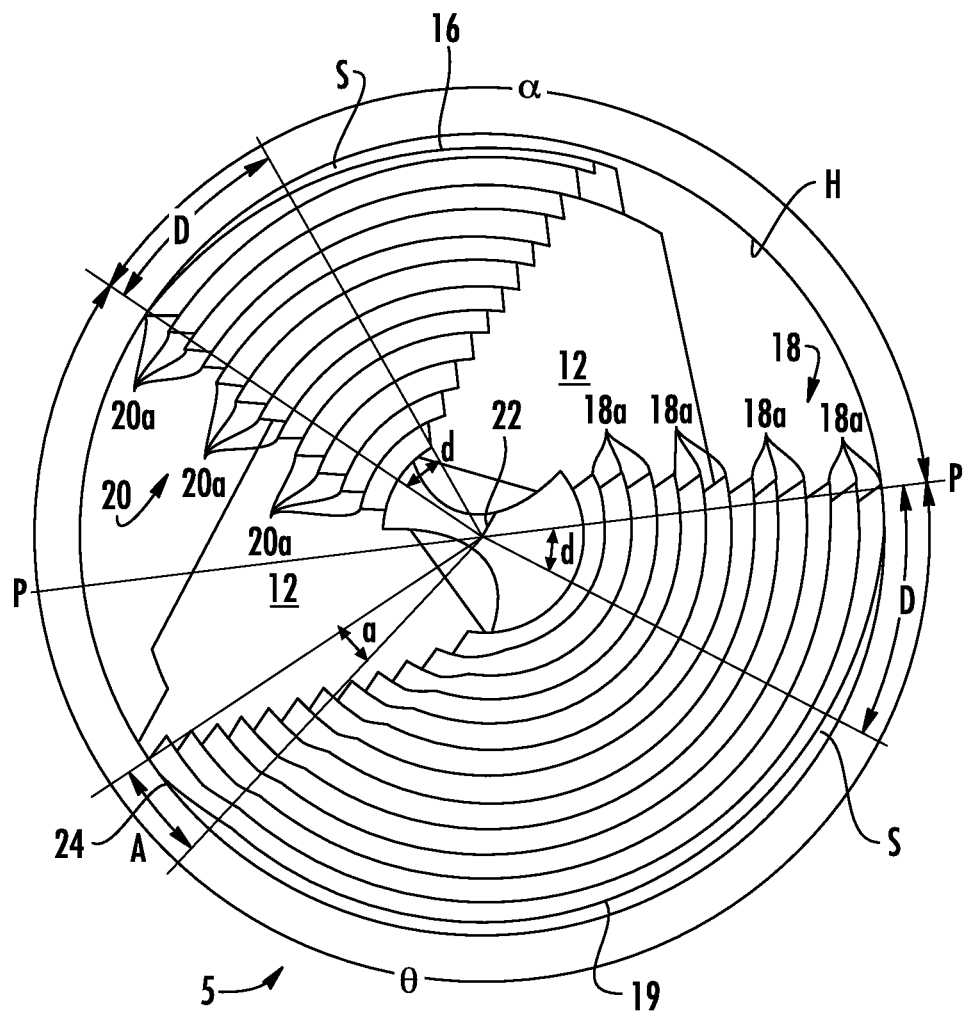
FIG. 4 is an end view of a second end of an embodiment of the step drill bit.

The flutes 12 and cutting edges 18, 20 are not disposed 180 degrees from one another such that the bit is asymmetric in a plane perpendicular to the longitudinal axis A-A relative to a plane containing the longitudinal axis A-A. FIG. 4 shows the bit where the plane of FIG. 4 is perpendicular to a plane containing the axis A-A. While a plane P-P is shown to illustrate the asymmetry of the bit, a plane containing axis A-A having other angular orientations may be used to show the asymmetry of the cutting edges 18 and 20 and in some embodiments the cutting edges 18 and 20 are asymmetric to any plane containing axis A-A. In a symmetric two flute bit the cutting edges 18 and 20 are disposed 180 degrees from one another such that the bit would be symmetrical about a plane containing the axis A-A. In the bit of the invention the cutting edges 18 and 20 and flutes 12 are not disposed symmetrically about the axis A-A. In the illustrated embodiment the cutting edges 18 and 20 are disposed at a minor central angle α approximately 140 degrees from one another. The angle α is the angle between a first line drawn from axis A-A to a step cutting edge 20a on one step and a second line drawn from the axis A-A to step cutting edge 18a on the same step. The corresponding major central angle θ between the step cutting edges 18a, 20a is approximately 220 degrees. While a specific minor central angle α and major central angle θ is shown in the drawings the specific angular spacing between the step cutting edges 18a, 20a may vary. In some embodiments the minor central angle may be between approximately 120 and 160 degrees and the major central angle may be between approximately 200 and 240 degrees. In the illustrated embodiment the two flutes 12 are substantially identical; however, the flutes may have different shapes and/or sizes. Because the two flutes 12 are approximately the same size and shape, the lands 14 and 16 extend for different central angles. As shown, land 14 extends for a greater central angle than land 16 and is larger than land 16.

Another way to define the asymmetry of the bit is by the arc length of the circumference of the bit between the step cutting edges 18a, 20a of each step. In one embodiment the minor distance between the step cutting edges 18*a*, 20*a* is approximately 33 percent to 45 percent of the circumference of the step defined by the step cutting edges and the major distance between the step cutting edges 18*a*, 20*a* is approximately 55 percent 67 percent of the circumference of the step defined by the step cutting edges. The central angle and arc length are related for any given circle diameter such that the circumferential distances described herein may be described in terms of arc length and/or central angle.

Use of the asymmetrical cutting edges 18 and 20 as described herein may be used to create a three point contact between each step 8 of the drill bit and the side wall of the hole being cut H. Contact is made with the side wall of the hole being cut H at the first cutting edge 18, the second cutting edge 20 and a rubbing portion 24 formed on one of the lands 14, 16. The three points of contact stabilize the bit as the hole is drilled resulting in a truer round hole as will be explained.

It will be understood that when a twist bit is used to cut a relatively deep hole, the side wall of the hole serves to stabilize the bit as the bit drills into the material. With a step drill bit, because the hole being drilled may be relatively shallow, the bit is not stabilized by the engagement of a significant length of the bit with the side wall of the hole being drilled. The use of a three point contact as described herein stabilizes the bit even when drilling shallow holes in thin-walled material. Single flute step bits are known that drill true round holes; however, the use of a single flute creates a single cutting edge such that single flute bits require more feed pressure and torque than double flute drill bits. Single flute step drill bits also generate more heat in the bit and in the material being cut than double flute step drill bits. Double flute symmetrical step drill bits are also known that provide two cutting edges spaced 180 degrees from one another. However, double flute symmetrical step bits only have two points of contact and are not stabilized such that they are more difficult to control during drilling. As a result, double flute symmetrical step bits tend to "travel" as the hole is cut causing non-round holes. Double flute symmetrical step bits also generate a significant amount of vibration and chatter in the bit. The asymmetric double flute step drill bit described herein provides a drill bit that has the cutting advantages of a symmetric double fluted bit but that is easy to control during drilling and that drills true round holes.

The third point of contact may be made by providing rubbing surface 24 on each of the steps 10. The rubbing surface 24 contacts the side wall of the hole being cut H, in addition to the two cutting edges 18, 20, to create a double flute step drill bit with three points of contact. In one embodiment, the rubbing surface 24 is created by using a negative relief at or near the trailing edge of the larger land 14. As shown in the figures, each step of the bit of the invention may comprise a positive radial relief that extends from the step cutting edges 18*a*, 20*a* toward the trailing edge of each step that may extend for an arc length D or central angle d from the step cutting edges 18*a*, 20*a*. With a positive radial relief the radius of each step section 10, 11 is gradually reduced from the cutting edge 18*a*, 20*a* toward the trailing edge of the step section to provide a space S between the peripheral surface 21 of the step sections and the side wall of the hole being cut H. The use of the positive radial relief minimizes interference and friction between the peripheral surface 21 of the step and the edge of the hole as the bit rotates.

The rubbing surface 24 may be provided by an area of negative relief on each step section 11 of land 14 where the radius of each step 10 of land 14 gradually increases until the peripheral surface 21 of each step extends approximately the same radius, or a slightly smaller radius, as the radius to the step cutting edge 18*a* for that step. The area of negative relief may be provided in for a small arc length A, or a small center angle a. The radius, from axis A-A to the rubbing surface 24, is the same or slightly less than the radius of the cutting edges 18, 20 without creating undue interference with the wall of the bore H being cut. The maximum radius from the axis A-A to the rubbing surface 24 is selected to be large enough that the rubbing surface 24 is in close proximity to the edge of the hole being cut (the effective diameter) such that the rubbing surface 24 provides support for the bit and the minimum radius of the rubbing portion 24 is selected to be small enough that the rubbing surface 24 does not bind on or create undue friction with the edge of the hole being cut. In some embodiments the radius to the rubbing portion 24 is approximately equal to or slightly less that the effective diameter of the step. As shown in the drawings three points of contact are created between the side wall of the hole being cut H and each step of the bit. The first point of contact is at cutting edge 20, the second point of contact is at cutting edge 18 and the third point of contact is at rubbing surface 24. The three points of contact stabilize the bit during drilling to provide a true round hole.

While the rubbing surface 24 is shown in the drawings located at the trailing end of the larger land 14 the rubbing surface may be located anywhere along the length of the land 14. In some embodiments the rubbing surface 24 may be formed other than by using a negative relief provided that the rubbing surface 24 is formed approximately on the effective diameter of the step and has a shape that does not interfere with the rotation of the bit. In some embodiments the rubbing surface may be formed on the smaller land 16. By configuring the bit such that the cutting edges are asymmetrically arranged relative to one another, the center angle between the cutting edges is greater than 180 degrees in one direction and less than 180 degrees in the opposite direction (or the arc length between the cutting edges is greater than 50% of the circumference in one direction and less than 50% of the circumference in the opposite direction). The rubbing surfaces 24 may be arranged on the larger land such that the three points of contact may be relatively evenly disposed about the periphery of the bit. While the two cutting edges 18, 20 and the rubbing surface 24 may not necessarily be spaced 120 degrees from one another, the contact points may be relatively evenly distributed about the periphery of the bit by asymmetrically arranging the cutting edges. For example, in the illustrated embodiment the minor central angle α between the cutting edges is approximately 140 degrees and the rubbing surface 24 is disposed generally in the middle of the 220 degree major central angle θ, although the rubbing surfaces need not be exactly in the center of the major diameter. By arranging the cutting edges 18, 20 asymmetrically and extending the trailing edge of the one land, for example land 14, to extend to approximately a midpoint of the major central angle θ the three points of contact may be relatively evenly spaced from one another.

As previously explained, the step sections 10 and 11 are formed with a positive radial relief such that behind the step cutting edges 18*a*, 20*a* the peripheral surfaces 21 of the step sections 10 and 11 extend inwardly away from the side wall of the hole being cut H such that an increasingly large space or gap S is provided between the peripheral wall of the step 21 and the side wall of the hole being cut H to thereby minimize interference and friction between the step portion and the wall of the hole. The radial relief may extend for an arc length D (or center angle d) from the step cutting edges 18a, 20a at which point the peripheral wall 21 of the step sections 10 and 11 is formed as an arc of a circle such that the size of the space S does not continue to increase from the end of the radial relief section towards the end of the land.

The step sections 10 and 11 also may be provided with an axial relief. To create the axial relief each step section 10 and 11 may be configured to have a helical pitch from the step cutting edge 18a, 20a for a distance along the circumference of the step as shown in FIG. 2. The axial relief may be defined as the angle β of the step section relative to a plane perpendicular to the longitudinal axis A-A of the bit where the axial relief is similar to the helical pitch in a fluted twist drill. The axial relief also may be defined as a linear distance Δ between a plane that is perpendicular to the longitudinal axis A-A at any point along the circumference of the bit. The axial relief may extend for an arc length (or center angle) from the step cutting edges. For example, the axial relief may be approximately 2-15 degrees (β), and in some embodiments may be approximately 5 degrees, relative to a plane that is perpendicular to the longitudinal axis A-A and may extend for a central angle of approximately 5-30 degrees from the cutting edges 18a, 20a, and in some embodiments may extend for a central angle of approximately 15 degrees. The axial relief may be a change in distance of approximately 0.005-0.025 inches (Δ), and in some embodiments may be approximately 0.05 inches, and may extend for a center angle (E) of approximately 5-30 degrees from the cutting edges 18a, 20a, and in some embodiments may extend for a central angle of approximately 15 degrees.

In the bit of the invention the distance (D) the radial relief extends from the cutting edges 18a, 20a and the distance (E) the axial relief extends from the cutting edges 18a, 20a may be decoupled such that the radial relief and the axial relief extend from the cutting edges different central angles or arc lengths as shown in FIG. 3. In some embodiments, the radial relief may extend for a relatively short circumferential distance (D) while the axial relief may extend for a much greater circumferential distance (E) such that the distance the radial relief extends is less than the distance the axial relief extends. Extending the radial relief for a relatively short arc length provides a more stable bit because the gap S does not increase over a large arc length of the step while extending the axial relief for a relatively long distance provides a faster cutting bit. The distances the axial and radial reliefs extend from the cutting edges may be selected based on the particular application. Moreover, the amount of radial relief, the amount of axial relief and the distances the reliefs extend from the cutting edges 18a, 20a may vary from step to step such that different steps have different axial and radial reliefs.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A step drill bit comprising:
a cutting head defining a longitudinal axis;
a first flute and a second flute dividing the cutting head into a first land and a second land, each of the first land and the second land comprising a plurality of steps having different effective diameters;
each of the plurality of steps of the first land comprising;
a first cutting edge and a first trailing edge formed in the first land;
each of the plurality of steps in the second land comprising:
a second cutting edge and a second trailing edge formed in the second land;
a negative radial relief provided between at least one of the first cutting edge and the first trailing edge of the first land or the second cutting edge and the second trailing edge of the second land in at least two of the plurality of steps of the first land and the second land, wherein the negative radial relief increases a radius of the first land between the at least one of the first cutting edge and the first trailing edge and towards the first trailing edge or of the second land between the second cutting edge and the second trailing edge and towards the second trailing edge in at least two of the plurality of steps,
wherein the first cutting edge and the second cutting edge are arranged such that the bit is asymmetric in a plane perpendicular to the longitudinal axis relative to a plane containing the longitudinal axis.

2. The step drill bit of claim 1, wherein the first land and the first flute create the first cutting edge and the second land and the second flute create the second cutting edge.

3. The step drill bit of claim 1, wherein the first cutting edge and the second cutting edge are disposed at a center angle relative to one another of less than 180 degrees.

4. The step drill bit of claim 1, wherein the first cutting edge is disposed at a center angle of between approximately 120 and 160 degrees relative to the second cutting edge.

5. The step drill bit of claim 1, wherein the first cutting edge is disposed at a center angle of approximately 140 degrees relative to the second cutting edge.

6. The step drill bit of claim 1, wherein the first land extends for a greater center angle than the second land.

7. The step drill bit of claim 6, wherein the negative radial relief defines a rubbing surface and wherein the first cutting edge, the second cutting edge and the rubbing surface formed on each of the plurality of steps of at least one of the first land and the second land extend to approximately the effective diameter.

8. The step drill bit of claim 7, wherein the rubbing surface is formed on at least one of the first trailing edge and the second trailing edge of each of the plurality of steps of at least one of the first land and the second land.

9. The step drill bit of claim 1, wherein the plurality of steps of the first land and the second land are configured to create three points of contact between each of the plurality of steps of the first land and the second land and a side wall of a hole being cut.

10. The step drill bit of claim 1, wherein the negative radial relief defines a rubbing surface and wherein the first cutting edge, the second cutting edge and the rubbing surface formed on each of the plurality of steps of at least one of the first land and the second land extend to approximately the effective diameter.

11. The step drill bit of claim 1, wherein each of the plurality of steps of the first land and the second land comprises a positive radial relief extending from the first cutting edge and the second cutting edge a first arc length and each of the plurality of steps of the first land and the second land is formed with an axial relief extending from the first cutting edge and the second cutting edge a second arc length where the first arc length and the second arc length are different.

12. The step drill bit of claim 11, wherein the first arc length is less than the second arc length.

13. The step drill bit of claim 11, wherein at least one of the first arc length and the second arc length are different on at least two of the plurality of steps of the first land and the second land.

14. A step drill bit comprising:
a cutting head defining a longitudinal axis; and having a plurality of steps having different effective diameters, each of the plurality of steps comprising a first step cutting edge, a first step trailing edge, a second step cutting edge, and a second step trailing edge and a rubbing surface defined by a negative relief formed between at least one of the first step cutting edge and first step trailing edge or the second step cutting edge and second step trailing edge on each step, wherein the negative relief increases a radius of each respective step between the at least one of the first step cutting edge and the first step trailing edge and towards the first step trailing edge or between the second step cutting edge and the second step trailing edge and towards the second step trailing edge on each of the plurality of steps, and wherein the rubbing surface extends to approximately the effective diameter of that step.

15. The step drill bit of claim 14, wherein the first step cutting edge is disposed at a center angle of between approximately 120 and 160 degrees relative to the second step cutting edge.

16. The step drill bit of claim 14, wherein the cutting head comprises two flutes that define a first land and a second land, wherein the first land is larger than the second land, wherein the first step cutting edge is disposed along a first edge of the first land and the first step trailing edge is disposed along a second edge of the first land, wherein the second step cutting edge is disposed along a first edge of the second land and the second step trailing edge is disposed along a second edge of the second land, and wherein the rubbing surface is disposed on the first land.

17. The step drill bit of claim 16, wherein the rubbing surface is located adjacent the first step trailing edge of the first land.

18. The step drill bit of claim 14, wherein each of the plurality of steps comprises a positive radial relief extending from the first step cutting edge and the second step cutting edge a first center angle and each of the plurality of steps is formed with an axial relief extending from the first step cutting edge and the second step cutting edge a second center angle where the first center angle and the second center angle are different.

* * * * *